(12) United States Patent
Tanaka et al.

(10) Patent No.: US 8,211,981 B2
(45) Date of Patent: Jul. 3, 2012

(54) POLY(4-METHYL-1-PENTENE) RESIN COMPOSITION, FILM CONTAINING SAME, MICROPOROUS FILM, BATTERY SEPARATOR AND LITHIUM ION BATTERY

(75) Inventors: Tooru Tanaka, Yokohama (JP); Youhei Houtani, Ichihara (JP); Atsushi Morita, Ichihara (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 0 days.

(21) Appl. No.: 13/054,833

(22) PCT Filed: Jul. 29, 2009

(86) PCT No.: PCT/JP2009/003594
§ 371 (c)(1),
(2), (4) Date: Jan. 19, 2011

(87) PCT Pub. No.: WO2010/013467
PCT Pub. Date: Feb. 4, 2010

(65) Prior Publication Data
US 2011/0144224 A1    Jun. 16, 2011

(30) Foreign Application Priority Data

Aug. 1, 2008 (JP) .................................. 2008-199522
Jan. 9, 2009 (JP) .................................. 2009-003006

(51) Int. Cl.
*C08F 8/00* (2006.01)
*C08F 10/14* (2006.01)
*C08F 110/14* (2006.01)
*C08F 210/14* (2006.01)

(52) U.S. Cl. ..................................... 525/191; 526/348.4
(58) Field of Classification Search .................. 525/191; 526/348.4
See application file for complete search history.

(56) References Cited

U.S. PATENT DOCUMENTS

| 5,115,054 A * | 5/1992 | Stricklen et al. ............... 526/159 |
| 5,677,360 A | 10/1997 | Yamamori et al. |
| 7,803,888 B2 * | 9/2010 | Kawahara et al. ............ 526/170 |
| 2008/0315066 A1 | 12/2008 | Tanaka et al. |

FOREIGN PATENT DOCUMENTS

| EP | 0 219 198 A1 | 4/1987 |
| EP | 1 754 724 A1 | 2/2007 |
| JP | 63-063707 A | 3/1988 |
| JP | 10-017692 A | 1/1998 |
| JP | 11-240970 A | 9/1999 |
| JP | 2005-126625 A | 5/2005 |
| JP | 2005-145999 A | 6/2005 |
| JP | 2006-070252 A | 3/2006 |
| JP | 2008-094909 A | 4/2008 |
| JP | 2008-144155 A | 6/2008 |
| WO | WO 92/14783 A1 | 9/1992 |
| WO | WO 2006/109631 A1 | 10/2006 |

OTHER PUBLICATIONS

Extended Search Report from European Patent Office issued in corresponding European Patent Application No. 09802716.2 dated Sep. 26, 2011.
International Search Report (PCT/ISA/210) issued on Oct. 20, 2009, by Japanese Patent Office as the International Searching Authority for International Application No. PCT/JP2009/003594.

* cited by examiner

*Primary Examiner* — Nathan M Nutter
(74) *Attorney, Agent, or Firm* — Buchanan Ingersoll & Rooney PC

(57) ABSTRACT

Disclosed is a poly(4-methyl-1-pentene) resin composition having an excellent balance between micropore formability and toughness, which can sufficiently form fine pores by drawing and does not cause a break during drawing. The poly(4-methyl-1-pentene) resin composition contains 0-90 parts by mass of a 4-methyl-1-pentene homopolymer (A) and 10-100 parts by mass of a 4-methyl-1-pentene copolymer (B) having a structural unit derived from 4-methyl-1-pentene and a structural unit derived from a $C_{2-20}$ α-olefin other than 4-methyl-1-pentene. The content of the structural unit derived from a $C_{2-20}$ α-olefin other than 4-methyl-1-pentene is 0.1-2.1% by mass relative to the total amount of the homopolymer (A) and the copolymer (B). The poly(4-methyl-1-pentene) resin composition also contains 0.1-800 ppm of a nucleator (C) relative to the total weight of the homopolymer (A) and the copolymer (B).

11 Claims, 1 Drawing Sheet

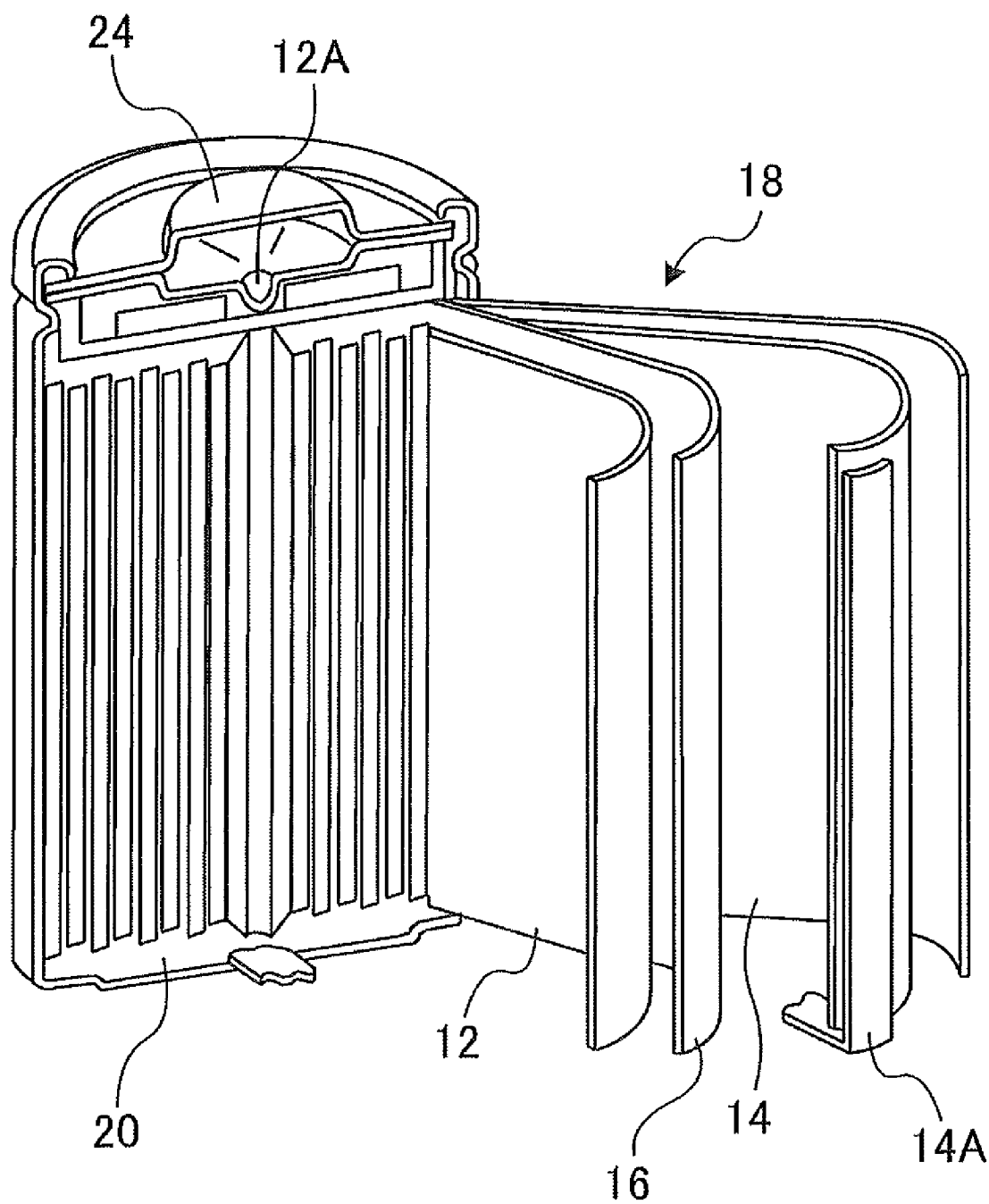

POLY(4-METHYL-1-PENTENE) RESIN COMPOSITION, FILM CONTAINING SAME, MICROPOROUS FILM, BATTERY SEPARATOR AND LITHIUM ION BATTERY

TECHNICAL FIELD

The present invention relates to poly(4-methyl-1-pentene) resin compositions, films containing the same, microporous films, battery separators, and lithium ion batteries.

BACKGROUND ART

The nickel-cadmium battery has been generally used as a rechargeable secondary battery. Recently, with the prevalence of smaller electric devices including cellular phones, personal-handy phone systems (PHSs) and mobile PCs, lithium ion batteries which are lightweight, smaller and less environmentally damaging than the nickel-cadmium battery are being widely used. Meanwhile, for reduced $CO_2$ emission, hybrid vehicles, which use a gasoline engine and electric motor(s) as power sources, have been on the market. Hybrid vehicles use a nickel-hydrogen battery. For reduced manufacturing costs, research is being made on the development of high-performance lithium ion batteries that can replace the expensive nickel-hydrogen batteries.

A separator in a lithium-ion battery allows an electrolyte or ions to pass through while separating the cathode and anode from each other so as to avoid a short circuit between the electrodes. To achieve this, the separator is required to have various properties in electrical, chemical, and mechanical aspects. For example, in order to manufacture lightweight and small batteries, the separator needs to have sufficient mechanical strength even when it is made thin.

Moreover, the separator needs to meet particularly strict battery safety requirements. For instance, when a high current flowed due to an external short circuit, the separator should swiftly break the battery circuit. Currently, for lithium-ion battery separators, polyethylene microporous sheets are in practical use. These sheets are manufactured either by stretching or phase separation. The polyethylene microporous sheet melts at relatively low temperatures of heat generated due to a short circuit, thereby closing micropores to break the battery circuit and avoiding possible temperature increases in the battery after the closure of the micropores.

However, it is important that the separator offer not only excellent "shutdown characteristics" that allows its micropores to close when exposed relatively low temperatures, but excellent "shape retention" that allows the separator to retain its shape when exposed to high temperatures. Failure to retain the separator's shape at high temperatures brings the battery to a dangerous state of direct contact between the cathode and anode. For their low melting points, conventional polyethylene microporous sheets have the disadvantage of insufficient shape retention. To overcome this problem, separators are proposed in which a polyethylene film and a polypropylene film whose melting point is higher than that of the polyethylene film are laminated. These separators, however, have met with only limited success, with somewhat improved shape retention.

As a candidate for films that would offer excellent shape retention at high temperatures, porous films made of high-melting point polyolefin such as poly(4-methyl-1-pentene) or polypropylene have been studied.

As a method of obtaining a high yield of 4-methyl-1-pentene copolymer, a method of preparing 4-methyl-1-pentene copolymer in two stages using different amounts of α-olefin is disclosed (see, e.g., Patent Literature 1). The literature states that the method can produce a high yield of 4-methyl-1-pentene copolymer having high transparency.

Resin compositions containing 4-methyl-1-pentene polymer and 4-methyl-1-pentene copolymer are disclosed (see, e.g., Patent Literature 2).

As resin compositions suitable for battery separators, there are also disclosed resin compositions containing polyolefin resin and a nucleating agent, wherein the polyolefin resin consists of crystalline polypropylene and propylene-α-olefin copolymer (see, e.g., Patent Literature 3).

CITATION LIST

Patent Literature

[PTL 1] Japanese Patent Application Laid-Open No. 63-63707
[PTL 2] Japanese Patent Application Laid-Open No. 2006-70252
[PTL 3] Japanese Patent Application Laid-Open No. 2005-126625

SUMMARY OF INVENTION

Technical Problem

However, the 4-methyl-1-pentene copolymer film of Patent Literature 1 cannot be fully made microporous by even stretching. Accordingly, the film has a drawback of poor electrolyte or ion permeability when used as a battery separator.

The resin compositions disclosed by Patent Literature 2 offer heat resistance and releasing property which are suitable for releasing films, frames for manufacturing electric component sealing materials or LED molds, but cannot be made microporous by stretching due to relatively high levels of comonomers. Thus the resin compositions of Patent Literature 2 fail to offer a good balance between micropore formability and toughness, a property required in battery separators.

The resin compositions disclosed by Patent Literature 3, on the other hand, offer a relatively good balance between micropore formability and toughness of certain levels, but fail to offer sufficient shape retention at high temperatures due to the presence of polypropylene as a main component. Moreover, the resin compositions need to contain a relatively large amount of a nucleating agent in order to obtain a certain level of micropore formability.

Thus, making a resin film fully microporous by stretching requires amply creating crystalline sites where stress is concentrated during film stretching. At the same time, a certain level of toughness is also required so as to avoid film breakage during stretching. However, it has been difficult in the art to obtain, from high-melting point polyolefins such as poly(4-methyl-1-pentene), films that can be fully made microporous by stretching without causing, breakage while it is stretched.

It is therefore an object of the present invention to provide poly(4-methyl-1-pentene) resin compositions that can be made microporous by stretching more easily than conventional high-melting point polyolefins. It is another object of the present invention to provide poly(4-methyl-1-pentene) resin compositions that offer a good balance between micropore formability and toughness so as to avoid film breakage during stretching. It is still another object of the present invention to provide films and microporous films that contain the poly(4-methyl-1-pentene) resin compositions so that their shape remains stable even when exposed to high temperatures and thus can enable the cathode and anode to be electrically insulated from each other, and battery separators including the microporous films such as lithium-ion battery separators.

Solution to Problem

The inventors conducted extensive studies to solve the aforementioned problems pertinent in the art and, as a result, established that a poly(4-methyl-1-pentene) resin composition which contains specific amounts of copolymer (B) formed of 4-methyl-1-pentene and $C_{2-20}$ α-olefin, and either nucleating agent (C) or 4-methyl-1-pentene homopolymer (A) offers a good balance between micropore formability and toughness, wherein micropore formability is a property that makes the resin composition fully microporous by stretching, and toughness is a property that prevents breakage of the film during stretching. The inventors also established that the resultant film has a high porosity. The inventors thus completed the present invention.

A first aspect of the present invention relates to poly(4-methyl-1-pentene) resin compositions given below.

[1] A poly(4-methyl-1-pentene) resin composition including:
 0-90 parts by mass of 4-methyl-1-pentene homopolymer (A); and
 10-100 parts by mass of 4-methyl-1-pentene copolymer (B) which has a unit derived from 4-methyl-1-pentene and a unit derived from a $C_{2-20}$ α-olefin other than 4-methyl-1-pentene, the total amount of homopolymer (A) and copolymer (B) being 100 parts by mass,
 wherein the amount of the unit derived from a $C_{2-20}$ α-olefin other than 4-methyl-1-pentene is 0.1-2.1 mass % based on the total amount of 4-methyl-1-pentene homopolymer (A) and 4-methyl-1-pentene copolymer (B), and
 the resin composition further comprises 0.1-800 ppm of nucleating agent (C) based on the total weight of 4-methyl-1-pentene homopolymer (A) and 4-methyl-1-pentene copolymer (B).

[2] The poly(4-methyl-1-pentene) resin composition according to [1] above, wherein the resin composition comprises 5-90 parts by mass of 4-methyl-1-pentene homopolymer (A) and 10-95 parts by mass of 4-methyl-1-pentene copolymer (B), and the amount of the unit derived from a $C_{2-20}$ α-olefin other than 4-methyl-1-pentene is 0.1-2.0 mass % based on the total amount of 4-methyl-1-pentene homopolymer (A) and 4-methyl-1-pentene copolymer (B).

[3] The poly(4-methyl-1-pentene) resin composition according to [1] or [2] above, wherein the resin composition comprises 15-50 parts by mass of 4-methyl-1-pentene copolymer (B).

[4] The poly(4-methyl-1-pentene) resin composition according to [1] above, wherein the resin composition comprises 100 parts by mass of 4-methyl-1-pentene copolymer (B).

[5] The poly(4-methyl-1-pentene) resin composition according to any one of [1] to [4] above, wherein the amount of nucleating agent (C) is 0.1-100 ppm based on the total weight of 4-methyl-1-pentene homopolymer (A) and 4-methyl-1-pentene copolymer (B).

[6] The poly(4-methyl-1-pentene) resin composition according to any one of [1] to [5] above, wherein nucleating agent (C) is at least one compound selected from the group consisting of sodium 2,2-methylenebis(4,6-di-tert-butylphenyl) phosphate, aluminum tris(p-tert-butylbenzoate), stearate, bis (p-methylbenzylidene) sorbitol, bis(4-ethylbenzylidene) sorbitol, talc, calcium carbonate and hydrotalcite.

A second aspect of the present invention relates to films, microporous films, battery separators and lithium-ion batteries given below.

[7] A film made of the poly(4-methyl-1-pentene) resin composition according to any one of [1] to [6] above.

[8] The film according to [7] above, wherein the film has micropores formed therein.

[9] A microporous film made of a poly(4-methyl-1-pentene) resin composition, the resin composition including:
 5-90 parts by mass of 4-methyl-1-pentene homopolymer (A); and
 10-95 parts by mass of 4-methyl-1-pentene copolymer (B) which has a unit derived from 4-methyl-1-pentene and a unit derived from a $C_{2-20}$ α-olefin other than 4-methyl-1-pentene, the total amount of homopolymer (A) and copolymer (B) being 100 parts by mass,
 wherein the amount of the unit derived from a $C_{2-20}$ α-olefin other than 4-methyl-1-pentene is 0.1-2.0 mass % based on the total amount of 4-methyl-1-pentene homopolymer (A) and 4-methyl-1-pentene copolymer (B).

[10] The microporous film according to [9] above, wherein the film comprises 15-50 parts by mass of 4-methyl-1-pentene copolymer (B).

[11] The microporous film according to [9] or [10] above, wherein the film further comprises 0.1-800 ppm of nucleating agent (C) based on the total weight of 4-methyl-1-pentene homopolymer (A) and 4-methyl-1-pentene copolymer (B).

[12] The microporous film according to [11] above, wherein the amount of nucleating agent (C) is 0.1-100 ppm based on the total weight of 4-methyl-1-pentene homopolymer (A) and 4-methyl-1-pentene copolymer (B).

[13] The microporous film according to [11] or [12] above, wherein nucleating agent (C) is at least one compound selected from the group consisting of sodium 2,2-methylenebis(4,6-di-tert-butylphenyl) phosphate, aluminum tris(p-tert-butylbenzo ate), stearate, bis(p-methylbenzylidene) sorbitol, bis(4-ethylbenzylidene) sorbitol, talc, calcium carbonate and hydrotalcite.

[14] A battery separator including the film according to [7] or [8] above.

[15] A battery separator including the microporous film according to any one of [9] to [13] above.

[16] The battery separator according to [14] or [15] above, wherein the battery separator is used for a lithium-ion battery.

[17] A lithium-ion battery including the battery separator according to [16] above.

Advantageous Effects of Invention

Poly(4-methyl-1-pentene) resin compositions according to the present invention can be provided with many micropores when subjected to stretching and thus can form stretched films with a high porosity. Moreover, since the poly(4-methyl-1-pentene) resin compositions have a certain level of toughness, they are less prone to breakage during film formation by stretching. Thus the poly(4-methyl-1-pentene) resin compositions offer an excellent balance between micropore formability and toughness. In addition, resultant stretched films offer excellent shape retention at high temperatures.

Thus, microporous films made of poly(4-methyl-1-pentene) resin composition according to the present invention lend themselves to use as battery separators for lithium-ion batteries or other batteries and therefore are of high industrial value.

BRIEF DESCRIPTION OF DRAWINGS

FIG. 1 illustrates an example of a structure of a lithium-ion battery.

DESCRIPTION OF EMBODIMENTS

1. Poly(4-methyl-1-pentene) resin composition

A poly(4-methyl-1-pentene) resin composition according to the present invention contains 4-methyl-1-pentene copolymer (B) having a unit derived from 4-methyl-1-pentene and a unit derived from $C_{2-20}$ α-olefin other than 4-methyl-1-pentene; and either or both of 4-methyl-1-pentene homopolymer (A) and nucleating agent (C).

4-Methyl-1-pentene copolymer (B) is a copolymer which has a unit derived from 4-methyl-1-pentene and a unit derived from $C_{2-20}$ α-olefin, preferably $C_{7-20}$ α-olefin, more preferably $C_{8-20}$ α-olefin other than 4-methyl-1-pentene. 4-Methyl-1-pentene copolymer (B) may be either a random copolymer or a block copolymer.

The amount of the unit derived from 4-methyl-1-pentene in 4-methyl-1-pentene copolymer (B) is preferably 80 mass % or more, more preferably 80-99.9 mass %, further preferably 90-99.9 mass %, and most preferably 95-99.4 mass %. When the amount of the unit derived from 4-methyl-1-pentene falls within the range, it is possible to ensure a certain level of crystallinity. Moreover, when the amount of $C_{2-20}$ α-olefin other than 4-methyl-1-pentene falls within the range given later, it is possible to attain excellent toughness upon film stretching.

Examples of $C_{2-20}$ α-olefins other than 4-methyl-1-pentene include ethylene, propylene, 1-butene, 1-hexene, 1-heptene, 1-octene, 1-decene, 1-dodecene, 1-tetradecene, 1-hexadecene, 1-heptadecene, 1-octadecene and 1-eicosene, with 1-decene, 1-dodecene, 1-tetradecene, 1-hexadecene, 1-heptadecene and 1-octadecene being preferable. Further, in order to attain increased rigidity and elastic modulus in copolymer (B), it is more preferable to employ 1-decene, 1-dodecene or 1-tetradecene. These α-olefins may be used alone or in combination.

4-Methyl-1-pentene copolymer (B) may also have a unit derived from a comonomer unit other than the above $C_{2-20}$ α-olefins other than 4-methyl-1-pentene.

4-Methyl-1-pentene copolymer (B) may be prepared in the presence of a known catalyst such as Ziegler-Natta catalyst or metallocene. For example, as disclosed in JP-A No. 2003-105022, the copolymer can be obtained by copolymerization of 4-methyl-1-pentene with the above $C_{2-20}$ α-olefin in the presence of a catalyst. Intrinsic viscosity [η] of 4-methyl-1-pentene copolymer (B) as measured in accordance with ASTM J1601 is preferably 2.5-4 dl/g, more preferably 3-3.8 dl/g.

It suffices that 4-methyl-1-pentene homopolymer (A) is substantially a homopolymer of 4-methyl-1-pentene; it may also contain traces of a comonomer unit. Specifically, the amount of the unit derived from 4-methyl-1-pentene in homopolymer (A) is preferably 99.8-100 mass %, more preferably 99.9-100 mass %. Because 4-methyl-1-pentene homopolymer (A) is highly crystalline, a stretched film containing the same may have a high porosity.

4-Methyl-1-pentene homopolymer (A) may be prepared in the presence of a known catalyst such as Ziegler-Natta catalyst or metallocene, as with 4-methyl-1-pentene copolymer (B). For example, as disclosed in JP-A No. 2003-105022, the homopolymer can be obtained by polymerization of 4-methyl-1-pentene in the presence of a catalyst. Intrinsic viscosity [η] of 4-methyl-1-pentene homopolymer (A) as measured in accordance with ASTM J1601 is preferably 2.5-4 dl/g, more preferably 3-3.8 dl/g, as is 4-methyl-1-pentene copolymer (B).

A poly(4-methyl-1-pentene) resin composition according to the present invention contains 0-90 parts by mass, preferably 5-90 parts by mass, more preferably 50-90 parts by mass, and further preferably 50-85 parts by mass of 4-methyl-1-pentene homopolymer (A); and 10-100 parts by mass, preferably 10-95 parts by mass, more preferably 10-50 parts by mass, and further preferably 15-50 parts by mass of 4-methyl-1-pentene copolymer (B), wherein the total amount of homopolymer (A) and copolymer (B) is 100 parts by mass.

The amount of the unit derived from $C_{2-20}$ α-olefins other than 4-methyl-1-pentene is preferably 0.1-2.1 mass %, more preferably 0.1-2.0 mass %, based on the total weight of homopolymer (A) and copolymer (B). When the amount of the unit derived from $C_{2-20}$ α-olefins other than 4-methyl-1-pentene falls within the range, it shortens the crystallization half-time of the resin composition. Thus, when a film made of the resin composition is stretched a sufficient number of micropores can be created therein while imparting toughness that is enough to avoid possible breakage of the film during stretching.

In some embodiments, a poly(4-methyl-1-pentene) resin composition according to the present invention may also contain optional resin component(s) other than poly(4-methyl-1-pentene) so long as the objective of the present invention is not impaired. Examples of such optional resin components include high-density polyethylene, ultra-high molecular polyethylene, and polypropylene. Blending a small amount of such an optional resin component in the poly(4-methyl-1-pentene) resin composition may not only increase the porosity of a resultant microporous film, but improve the shutdown characteristics of the separators.

There are no particular limitations to nucleating agent (C); any desired nucleating agent can be used. Examples thereof include metal salt compounds such as sodium 2,2-methylenebis(4,6-di-tert-butylphenyl) phosphate, aluminum tris(p-tert-butylbenzoate) and stearate; sorbitol compounds such as bis(p-methylbenzylidene) sorbitol and bis(4-ethylbenzylidene) sorbitol; and inorganic compounds such as talc, calcium carbonate and hydrotalcite. Of these, sodium 2,2-methylenebis(4,6-di-tert-butylphenyl) phosphate is preferable in view of its ability of increasing crystallization temperature. These nucleating agents (C) may be used alone or in combination.

Nucleating agent (C), when added in 4-methyl-1-pentene copolymer (B), shortens the crystallization half-time of the poly(4-methyl-1-pentene) resin composition, facilitating the creation of many micropores and thus the production of a highly porous film.

When nucleating agent (C) is added in the poly(4-methyl-1-pentene) resin composition, the amount of nucleating agent (C) is preferably 0.1-800 ppm, more preferably 0.1-500 ppm, further preferably 0.1-100 ppm, and most preferably 10-100 ppm, based on the total weight of homopolymer (A) and copolymer (B). If the amount of nucleating agent (C) is smaller than 0.1 ppm, nucleating agent (C) fails to facilitate crystallization. On the other hand, if the amount of nucleating agent (C) is larger than 800 ppm, there is a fear that a phenomenon that inhibits the creation of pores during stretching occurs.

In some embodiments, a poly(4-methyl-1-pentene) resin composition according to the present invention may contain all of 4-methyl-1-pentene homopolymer (A), 4-methyl-1-pentene copolymer (B), and nucleating agent (C).

In cases where the poly(4-methyl-1-pentene) resin composition does not contain 4-methyl-1-pentene homopolymer (A), it preferable to set the amount of the unit derived from 4-methyl-1-pentene relatively high in 4-methyl-1-pentene copolymer (B), specifically to a range of 95-99.4 mass %, in order to enhance the crystallinity of copolymer (B).

In some embodiments, the poly(4-methyl-1-pentene) resin composition may contain additional optional component(s) so long as the objective of the present invention is not impaired. Examples of optional components include heat stabilizers, weather stabilizers, anticorrosive agents, copper deactivator, antistatic agents, and other additives generally blended in polyolefins.

A poly(4-methyl-1-pentene) resin composition according to the present invention can be prepared by the process including the steps of: mixing together the above components with a mixer such as BANBURY MIXER or HENSCHEL MIXER; and melt-kneading the obtained mixture with a uniaxial extruder, multiaxial extruder or kneader for granulation or grinding. The melt flow rate (MFR) of the poly(4-methyl-1-pentene) resin composition as measured in accordance with ASTM D1238 is preferably 10-40 g/10 min, more preferably 20-30 g/10 min, for attaining excellent film formability.

2. Microporous Film

A microporous film according to the present invention is prepared by the process including the steps of: forming a film made of the poly(4-methyl-1-pentene) resin composition above; and stretching the film.

In the film formation step, the poly(4-methyl-1-pentene) resin composition may be formed into a film by a known molding process such as press molding, extrusion molding, inflation molding or calendar molding. When extrusion molding is employed, an extruder such as a T-die cast film extrusion machine is used to melt a pellet of the resin composition and extrude the molten resin to be casted onto a chill roll so as to be cooled and solidified to form thereon a cast film. The thickness of the cast film is, for example, 20 μm although it depends on the intended application of the film.

The crystallization half-time of a film obtained from a poly(4-methyl-1-pentene) resin composition according to the present invention is preferably 58-98 seconds, more preferably 58-69 seconds. The crystallization half-time denotes the time it takes for a certain crystalline material to reach ½ full crystallinity when it transits from molten state to crystal state; the shorter the crystallization half-time, the higher the crystallization rate.

The crystallization half-time is measured by differential scanning calorimetry (DSC) as follows: the film is heated at 280° C. for 10 minutes, cooled to 220° C. at a cooling rate of 320° C./min, and retained at 220° C. to obtain a DSC crystallization curve. The crystallization half-time is defined as the time at which the value of the integrated area under the DSC crystallization curve becomes half the value of the integrated area of the exothermal peak which represents crystallization.

In the film stretching step, the film formed is stretched in specific direction to form micropores therein.

Examples of film stretching methods include, in addition to uniaxial stretching where a film is stretched in one direction, sequential biaxial stretching where a film is stretched in one direction and then stretched vertically to that direction; simultaneous biaxial stretching where a film is stretched vertically and horizontally at the same time; multistage uniaxial stretching where a film is stretched in one direction in multiple stages; sequential or simultaneous biaxial stretching followed by additional stretching; and so forth. Among these film stretching methods, uniaxial or biaxial stretching is preferable.

The porosity of the microporous film may be controlled by changing the stretch temperature and stretch ratio during film stretching.

The microporous film according to the present invention thus obtained preferably has a melting point of 220° to 240° C., which may be controlled by changing the kinds or amounts of α-olefins contained in the poly(4-methyl-1-pentene) resin composition.

The microporous film according to the present invention may have a high porosity, which is measured as follows: A surface of the microporous film is imaged at 10,000× magnification by SEM (Scanning Electron Microscope) ("S-4700", Hitachi, Ltd.), the total area of pores is measured with image processing software ("Image-Pro Plus", Planetron Inc.), and the ratio of the total area of pores to the total area of the surface is calculated.

A poly(4-methyl-1-pentene) resin composition according to the present invention contains 4-methyl-1-pentene copolymer (B)—a polymer with excellent toughness—and either 4-methyl-1-pentene homopolymer (A)—a polymer with high crystallinity—or nucleating agent (C). Thus, a film made of the poly(4-methyl-1-pentene) resin composition has many crystalline sites where stress is likely to be concentrated during stretching, whereby a sufficient number of micropores are created in the film after stretched. Moreover, since the film offers a certain level of toughness, possible film breakage can be prevented.

3. Battery Separator

A microporous film made of a poly(4-methyl-1-pentene) resin composition according to the present invention has a high melting point as well as high porosity. Thus, the microporous film is suitable as a separator for batteries including lithium-ion batteries, nickel-cadmium batteries and nickel-hydrogen batteries, particularly for lithium-ion batteries that require that the separator have excellent shape retention at high temperatures as well as high ion conductivity.

A battery separator according to the present invention may be formed only of a microporous film according to the present invention. Alternatively, the battery separator may be a multilayer film consisting of the microporous film according to the present invention and additional microporous film(s). In this case, in order to lower electric resistance of the battery separator, the multilayer film is preferably a two- or three-layer film.

There are no particular limitations to the additional microporous film in the multilayer film; for example, the film may be made of resin whose melting point is lower than that of 4-methyl-1-pentene. Examples of low-melting point resins include polyethylenes, polypropylenes, and 4-methyl-1-pentene copolymers with high levels of α-olefins. Such a multilayer film offers excellent shape retention at high temperatures, as well as excellent shutdown characteristics at relatively low temperatures.

The manufacturing method of the multilayer film is of two main types (a) and (b) below, depending on the order in which micropore formation and film lamination are performed:

(a) Micropores are first formed in the respective films, and the porous films are then laminated by means of heat-press bonding or using an adhesive or the like; and (b) Films are first laminated, and the laminate film is then made porous.

Method a) includes a method that involves bonding together of a microporous film according to the present invention and additional microporous film(s) by heat pressing by means of dry lamination, extrusion lamination, or heat lamination.

Method b) includes a method that involves co-extrusion of a poly(4-methyl-1-pentene) resin composition according to the present invention and other resin composition layer(s) to form a laminated film, followed by stretching of the film.

The thickness of the battery separator is, for example, 5-100 μm, preferably 10-30 μm. When the thickness of the battery separator is 5 μm or more, it is possible to obtain electric insulating property substantially required, thus reducing the likelihood of a short circuit even when high voltage has been applied, for example. When the thickness of the battery separator is 100 μm or less, it is possible to reduce electric resistance of the battery separator, whereby battery performance can be fully ensured while reducing the battery size.

4. Lithium-Ion Battery

A lithium-ion battery according to the present invention includes a roll consisting of an anode sheet, a battery separator, and a cathode sheet, wherein the battery separator is interposed between the anode and cathode; an electrolyte solution; and a battery case in which the roll and electrolyte solution are housed. The battery separator includes a microporous film made of a poly(4-methyl-1-pentene) resin composition according to the present invention.

The cathode sheet includes a current collector and a cathode active material layer. Examples of cathode active materials, a main component in the cathode active material layer, include metal oxides such as lithium cobalt oxides, lithium nickel oxides, lithium manganese oxides, and manganese dioxide. Where necessary, the cathode active material layer may contain an auxiliary conducting agent and/or a binder such as polytetrafluoroethylene. Examples of the current collector of the cathode sheet include a stainless steel net and aluminum foil. A metallic lead is welded to the current collector of the cathode sheet. The metallic lead is connected to the cathode terminal of the battery case.

The anode sheet includes a current collector and an anode active material layer. Examples of anode active materials, a main component in the anode active material layer, include carbon materials and metal oxides. Examples of carbon materials include graphites, pyrrolitic carbon, cokes and glassy carbons. Examples of the current collector of the anode sheet include copper foil. A metallic lead is welded to the current collector of the anode sheet. The metallic lead is connected to the anode terminal of the battery case.

The cathode sheet and anode sheet are prepared in any desired manner. For example, the cathode sheet is prepared by applying onto a metal foil (current collector) a cathode active material blended with an auxiliary conducting agent and/or binder, followed by drying and rolling.

The electrolyte solution is a solution or polymer solution of an electrolyte such as lithium salt dissolved in an organic solvent. Examples of organic solvents include propylene carbonate, ethylene carbonate, butylene carbonate, and γ-butyrolactone. These organic solvents may be used alone or in combination. The electrolyte is, for example, lithium hexafluorophosphate ($LiPF_6$).

The battery case incorporates therein an insulator, a safety vent, etc. There are no particular limitations to the shape of the battery case; the battery case shape includes cylindrical type, box type, and laminate type. The material of the battery case is, for example, aluminum in view of its physical properties such as lightweightness.

FIG. 1 is a perspective sectional view illustrating an example of a structure of a lithium-ion battery. As illustrated in FIG. 1, lithium-ion battery 10 includes roll 18 consisting of cathode sheet 12, battery separator 16, and anode sheet 14, battery separator 16 being interposed between cathode sheet 12 and anode sheet 14; an electrolyte solution (not illustrated); and battery case 20 in which these components are housed. Battery case 20 is sealed at the top with cathode lid 24 attached to a gasket. Lead 12A welded to cathode sheet 12 is electrically connected to cathode lid 24, and lead 14A welded to anode sheet 14 is electrically connected to the inner bottom of battery case 20.

As described above, the battery separator which includes a microporous film made of a poly(4-methyl-1-pentene) resin composition according to the present invention has a high melting point as well as a high porosity. Thus, the battery separator which includes the microporous film according to the present invention has a high ion conductivity and excellent shape retention that enables the separator to retain its shape when exposed to extremes of temperature due to abnormal heat generation in the battery. In this way a short circuit between the cathode and anode can be avoided. It is therefore possible to provide a high-safety lithium-ion battery in which electric resistance derived from the battery separator is small.

EXAMPLES

The present invention will be described in more detail with reference to Examples, which however shall not be construed as limiting the scope of the invention thereto.

Example 1

Preparation of Solid Catalyst Component 750 g of anhydrous magnesium chloride, 2,800 g of decane, and 3,080 g of 2-ethyhexylalcohol were reacted together at 130° C. for 3 hours to prepare a homogeneous solution. To this solution was added 220 ml of 2-isobutyl-2-isopropyl-1,3-dimethoxypropane, and stirred at 100° C. for a further 1 hour. The homogeneous solution obtained was cooled to room temperature. 3,000 ml of the solution was added dropwise to 800 ml of titanium tetrachloride maintained at −20° C. under stirring over a period of 45 minutes. Thereafter, the solution was heated to 110° C. in 4.5 hours. When the temperature reached 110° C., 5.2 ml of 2-isobutyl-2-isopropyl-1,3-dimethoxypropane was added, and the mixture was stirred at that temperature (110° C.) for a further 2 hour. After 2 hour-reaction, a solid was recovered by hot filtration, and resuspended in 1,000 ml of titanium tetrachloride and heated for 2 hours at 110° C. A solid was again recovered by hot filtration and repeatedly washed with 90° C. decane and hexane until no free titanium compounds were detected in the washings. The solid titanium catalyst component thus prepared was stored as a decane slurry. A portion of the slurry was dried and analyzed to determine the catalyst composition. The solid titanium catalyst component was found to contain 3.0 mass % of titanium, 17.0 mass % of magnesium, 57 mass % of chlorine, 18.8 mass % of 2-isobutyl-2-isopropyl-1,3-dimethoxypropane, and 1.3 mass % of 2-ethylhexylalcohol.

Production of 4-methyl-1-pentene homopolymer (A) ("homopolymer (A)")

A 150 L stainless steel (SUS) polymerization vessel equipped with a stirrer was charged in nitrogen gas atmosphere with 100 L of decane, 27 kg of 4-methyl-1-pentene, 6.75 L of hydrogen, 67.5 mmol of triethylaluminum, and 0.27 mol in terms of titanium atom of the solid titanium catalyst component. The inner temperature of the vessel was then raised to 60° C. and held at that temperature for 6 hours to effect polymerization. The resultant powder was taken out from the vessel, filtrated, washed, and dried to produce 26 kg of 4-methyl-1-pentene homopolymer (a-1). Intrinsic viscosity [η] of 4-methyl-1-pentene homopolymer (a-1) obtained was 3.5 dl/g.

[Intrinsic Viscosity [η]]

An automatic viscometer ("TYPE VNR053U", RIGO Co., Ltd.) was employed. Resin (0.25-0.27 g) was dissolved in 25 ml of decaline to prepare samples. In accordance with ASTM J1601, the samples were measured at 135° C. for their specific viscosity ηSP, for each sample the ratio of specific viscosity to concentration was calculated, and the ratios were extrapolated to zero concentration to find intrinsic viscosity [η].

Production of 4-methyl-1-pentene copolymer (B) ("copolymer (B)")

A 150 L stainless steel (SUS) polymerization vessel equipped with a stirrer was charged in nitrogen gas atmosphere with 100 L of decane, 27 kg of 4-methyl-1-pentene, 570 g of decene-1, 6.75 L of hydrogen, 67.5 mmol of triethylaluminum, and 0.27 mol in terms of titanium atom of the solid titanium catalyst component. The inner temperature of the vessel was then raised to 60° C. and held at that temperature for 6 hours to effect polymerization. The resultant powder was taken out from the vessel, filtrated, washed, and dried to produce 26 kg of 4-methyl-1-pentene copolymer (b-1). The decene-1 content was 2.1 mass %. Intrinsic viscosity [η] of 4-methyl-1-pentene copolymer (b-1) measured in the same manner as described above was 3.5 dl/g.

Manufacture of Microporous Film

Homopolymer (a-1) and copolymer (b-1) prepared above were blended at a ratio of homopolymer (a-1)/copolymer (b-1)=5/95 by mass. Known neutralizing agent and phenol antioxidant were added to the mixture and mixed in HENSCHEL MIXER, followed by melt-kneading at 280° C. with an extruder to produce a pellet. The pellet had a melt flow rate of 25 g/10 min.

Using a T-die cast film extrusion machine, a 20 μm-thick cast film was then produced from the pellet at a cylinder temperature of 270° C. and chill roll temperature of 60° C. The film was stretched by 30% of its length (i.e., in machine direction) at room temperature, and further stretched by 20% of its length in an 80° C. constant-temperature chamber, to produce a microporous film. Table 1 shows the evaluations of the physical properties (toughness and crystallization half-time) of the cast film and the physical property (porosity) of the microporous film.

[Melt Flow Rate (MFR)]

The measurement of the melt flow rate of the pellet was made in accordance with ASTM D1238 at a load of 5.0 kg and at a temperature of 260° C.

[Film Porosity]

A surface of the microporous film was imaged at 10,000× magnification by SEM (Scanning Electron Microscope) ("S-4700", Hitachi, Ltd.). The total area of pores in the image was measured with image processing software ("Image-Pro Plus", Planetron Inc.), and the ratio of the total area of pores to the total area of the surface was calculated to find a porosity.

[Toughness]

The toughness of the cast film was evaluated based on the following criteria:
A: 30% stretching was possible at room temperature
B: 20% stretching was possible at room temperature
C: 10% stretching was possible at room temperature

[Crystallization Half-Time]

10 mg sample was prepared from a sheet obtained by press molding of pellet. The sample was heated at 280° C. for 10 minutes in nitrogen gas atmosphere. Thereafter, a crystallization curve was obtained with a differential scanning calorimeter (Perkin-Elmer DSC-7) by cooling the sample to 220° C. at a cooling rate of 320° C./min and maintaining the sample at 220° C. Based on this crystallization curve, the crystallization half-time, $t_{1/2}$ (sec), was measured, which is the time at which a value of an integrated area under the exothermal peak of the crystallization curve reached half the value of the entire integrated area of the exothermal peak.

Example 2

Melt-kneading was conducted in the same manner as in Example 1 except that the homopolymer (a-1)/copolymer (b-1) ratio was set to 30/70 by mass. The obtained pellet had a MFR of 25 g/10 min. Film formation and film stretching were conducted to form a microporous film. The evaluation of the physical property of the microporous film is shown in Table 1.

Example 3

Melt-kneading was conducted in the same manner as in Example 1 except that the homopolymer (a-1)/copolymer (b-1) ratio was set to 50/50 by mass. The obtained pellet had a MFR of 25 g/10 min. Film formation and film stretching were conducted to form a microporous film. The evaluation of the physical property of the microporous film is shown in Table 1.

Example 4

Melt-kneading was conducted in the same manner as in Example 1 except that the homopolymer (a-1)/copolymer (b-1) ratio was set to 70/30 by mass. The pellet obtained had a MFR of 25 g/10 min. Film formation and film stretching were conducted to form a microporous film. The evaluation of the physical property of the microporous film is shown in Table 1.

Example 5

Melt-kneading was conducted in the same manner as in Example 1 except that the homopolymer (a-1)/copolymer (b-1) ratio was set to 85/15 by mass. The pellet obtained had a MFR of 25 g/10 min. Film formation and film stretching were conducted to form a microporous film. The evaluation of the physical property of the microporous film is shown in Table 1.

Example 6

Melt-kneading was conducted in the same manner as in Example 1 except that the homopolymer (a-1)/copolymer (b-1) ratio was set to 90/10 by mass. The pellet obtained had a MFR of 25 g/10 min. Film formation and film stretching were conducted to form a microporous film. 30% stretching at room temperature was difficult due to slightly insufficient toughness; thus, the film was stretched by 20% of its length at room temperature. The evaluation of the physical property of the microporous film is shown in Table 1.

Example 7

Production of 4-methyl-1-pentene copolymer (B)

A 150 L stainless steel (SUS) polymerization vessel equipped with a stirrer was charged in nitrogen gas atmosphere with 100 L of decane, 27 kg of 4-methyl-1-pentene, 1,080 g of a mixture of hexadecene-1 and octadecene-1, 6.75 L of hydrogen, 67.5 mmol of triethylaluminum, and 0.27 mol in terms of titanium atom of the solid titanium catalyst component. The inner temperature of the vessel was then raised to 60° C. and held at that temperature for 6 hours to effect polymerization. The resultant powder was taken out from the vessel, filtrated, washed, and dried to produce 26 kg of 4-methyl-1-pentene copolymer (b-3). The total ratio of hexadecene-1 and octadecene-1 was 4.0 mass %. Intrinsic viscosity [η] of 4-methyl-1-pentene copolymer (b-3) measured in the same manner as described above was 3.4 dl/g.

Melt-kneading was conducted in the same manner as in Example 1 except that copolymer (b-1) was replaced with copolymer (b-3) while setting the homopolymer (a-1)/copolymer (b-3) ratio to 80/20 by mass. The pellet obtained had a MFR of 26 g/10 min. Film formation and film stretching were conducted to form a microporous film. The evaluation of the physical property of the microporous film is shown in Table 1.

Example 8

Melt-kneading was conducted in the same manner as in Example 2 except that as nucleating agent (C) sodium 2,2-methylenebis(4,6-di-tert-butylphenyl) phosphate ("NA-11", ADEKA Co.) (hereinafter also referred to as "nucleating agent (c-1)") was additionally added in an amount of 80 wt ppm based on the total weight of homopolymer (A) and copolymer (B). The pellet obtained had a MFR of 25 g/10 min. Film formation and film stretching were conducted to form a microporous film. The evaluation of the physical property of the microporous film is shown in Table 1.

Example 9

Melt-kneading was conducted in the same manner as in Example 8 except that the added amount of nucleating agent (c-1) was set to 160 wt ppm. The pellet obtained had a MFR of 25 g/10 min. Film formation and film stretching were conducted to form a microporous film. The evaluation of the physical property of the microporous film is shown in Table 1.

Example 10

Melt-kneading was conducted in the same manner as in Example 8 except that the added amount of nucleating agent (c-1) was set to 320 wt ppm. The pellet obtained had a MFR of 25 g/10 min. Film formation and film stretching were conducted to form a microporous film. The evaluation of the physical property of the microporous film is shown in Table 1.

Example 11

Melt-kneading was conducted in the same manner as in Example 8 except that the added amount of nucleating agent (c-1) was set to 640 wt ppm. The pellet obtained had a MFR of 25 g/10 min. Film formation and film stretching were conducted to form a microporous film. The evaluation of the physical property of the microporous film is shown in Table 1.

Example 12

In the preparation process of copolymer (B) in Example 1, the added amount of decene-1 was changed to 160 g to produce 4-methyl-1-pentene copolymer (b-2) containing 0.6 mass % of decene-1. Melt-kneading was conducted in the same manner as in Example 8 except that copolymer (b-1) was replaced with copolymer (b-2) while setting the homopolymer (a-1)/copolymer (b-2) ratio to 0/100 by mass, and that the added amount of nucleating agent (c-1) was set to 10 wt ppm. Film formation and film stretching were conducted to form a microporous film. The evaluation of the physical property of the microporous film is shown in Table 2.

Example 13

Melt-kneading was conducted in the same manner as in Example 12 except that the added amount of nucleating agent (c-1) was set to 80 wt ppm. Film formation and film stretching were conducted to form a microporous film. The evaluation of the physical property of the microporous film is shown in Table 2.

Example 14

Melt-kneading was conducted in the same manner as in Example 12 except that the added amount of nucleating agent (c-1) was set to 200 wt ppm. Film formation and film stretching were conducted to form a microporous film. The evaluation of the physical property of the microporous film is shown in Table 2.

Example 15

Melt-kneading was conducted in the same manner as in Example 12 except that the added amount of nucleating agent (c-1) was set to 500 wt ppm. Film formation and film stretching were conducted to form a microporous film. The evaluation of the physical property of the microporous film is shown in Table 2.

Example 16

Melt-kneading was conducted in the same manner as in Example 13 except that nucleating agent (c-1) was replaced with talc ("ET-5", Matsumura Sangyo Co.) (hereinafter also referred to as "nucleating agent (c-2)"). Film formation and film stretching were conducted to form a microporous film. The evaluation of the physical property of the microporous film is shown in Table 2.

Example 17

Melt-kneading was conducted in the same manner as in Example 13 except that nucleating agent (c-1) was replaced with aluminum tris(p-tert-butyl benzoate) ("AL-PTBBA", Japan Chemtech Ltd.) (hereinafter also referred to as "nucleating agent (c-3)"). Film formation and film stretching were conducted to form a microporous film. The evaluation of the physical property of the microporous film is shown in Table 2.

Example 18

Melt-kneading was conducted in the same manner as in Example 13 except that nucleating agent (c-1) was replaced with bis(p-methylbenzylidene) sorbitol ("NC-6", Mitsui Chemicals, Inc.) (hereinafter also referred to as "nucleating agent (c-4)"). Film formation and film stretching were conducted to form a microporous film. The evaluation of the physical property of the microporous film is shown in Table 2.

Comparative Example 1

Melt-kneading was conducted in the same manner as in Example 1 except that only copolymer (b-1) (decene-1 content=2.1 mass %) was used. The obtained pellet had a MFR of 25 g/10 min. Film formation and film stretching were conducted to form a microporous film. The evaluation of the physical property of the microporous film is shown in Table 3.

Comparative Example 2

Melt-kneading was conducted in the same manner as in Example 1 except that only homopolymer (a-1) was used. The obtained pellet had a MFR of 25 g/10 min. Film formation and film stretching were conducted to form a microporous film. 30% stretching at room temperature was difficult due to insufficient toughness; thus, the film was stretched by 10% of its length at room temperature. The evaluation of the physical property of the microporous film is shown in Table 3.

Comparative Example 3

Melt-kneading was conducted in the same manner as in Comparative Example 1 except that only copolymer (b-2) prepared in Example 12 was used. The obtained pellet had a MFR of 25 g/10 min. Film formation and film stretching were conducted to form a microporous film. The evaluation of the physical property of the microporous film is shown in Table 3.

Comparative Example 4

Melt-kneading was conducted in the same manner as in Comparative Example 3 except that nucleating agent (c-1) was additionally added in an amount of 1,000 wt ppm based on the weight of copolymer (b-2). Film formation and film stretching were conducted to form a microporous film. The evaluation of the physical property of the microporous film is shown in Table 3.

TABLE 1

|  | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| Polymer (a-1) (mass %) | 5 | 30 | 50 | 70 | 85 | 90 | 80 | 30 | 30 | 30 | 30 |
| Polymer (b-1) (mass %) Decene-1 content: 2.1 mass % | 95 | 70 | 50 | 30 | 15 | 10 |  | 70 | 70 | 70 | 70 |
| Polymer (b-2) (mass %) Decene-1 content: 0.6 mass % |  |  |  |  |  |  |  |  |  |  |  |
| Polymer (b-3) (mass %) (hexadecene-1/octadecene-1) content: 4.0 mass % |  |  |  |  |  |  | 20 |  |  |  |  |
| Nucleating agent (c-1) (ppm) | 0 | 0 | 0 | 0 | 0 | 0 | 0 | 80 | 160 | 320 | 640 |
| Nucleating agent (c-2) (ppm) |  |  |  |  |  |  |  |  |  |  |  |
| Nucleating agent (c-3) (ppm) |  |  |  |  |  |  |  |  |  |  |  |
| Nucleating agent (c-4) (ppm) |  |  |  |  |  |  |  |  |  |  |  |
| α-olefin content (mass %) | 2 | 1.5 | 1.1 | 0.6 | 0.3 | 0.2 | 0.8 | 1.5 | 1.5 | 1.5 | 1.5 |
| Porosity (%) | 3.2 | 3.4 | 3.9 | 5.3 | 5 | 5.2 | 4.5 | 3.9 | 3.7 | 3.9 | 3.7 |
| Toughness | A | A | A | A | A | B | A | A | A | A | A |
| Crystallization half time (sec) | 98 | 76 | 69 | 67 | 61 | 58 | 71 | 75 | 66 | 58 | 50 |

TABLE 2

|  | Ex. 12 | Ex. 13 | Ex. 14 | Ex. 15 | Ex. 16 | Ex. 17 | Ex. 18 |
|---|---|---|---|---|---|---|---|
| Polymer (a-1) (mass %) | 0 | 0 | 0 | 0 | 0 | 0 | 0 |
| Polymer (b-1) (mass %) Decene-1 content: 2.1 mass % |  |  |  |  |  |  |  |
| Polymer (b-2) (mass %) Decene-1 content: 0.6 mass % | 100 | 100 | 100 | 100 | 100 | 100 | 100 |
| Polymer (b-3) (mass %) (hexadecene-1/octadecene-1) content: 4.0 mass % |  |  |  |  |  |  |  |
| Nucleating agent (c-1) (ppm) | 10 | 80 | 200 | 500 |  |  |  |
| Nucleating agent (c-2) (ppm) |  |  |  |  | 80 |  |  |
| Nucleating agent (c-3) (ppm) |  |  |  |  |  | 80 |  |
| Nucleating agent (c-4) (ppm) |  |  |  |  |  |  | 80 |
| α-olefin content (mass %) | 0.6 | 0.6 | 0.6 | 0.6 | 0.6 | 0.6 | 0.6 |
| Porosity (%) | 4 | 4.1 | 3.7 | 3.8 | 3.4 | 3.5 | 3.2 |
| Toughness | A | A | A | A | A | A | A |
| Crystallization half time (sec) | 92 | 85 | 74 | 65 | 112 | 117 | 116 |

TABLE 3

|  | Comp. Ex. 1 | Comp. Ex. 2 | Comp. Ex. 3 | Comp. Ex. 4 |
|---|---|---|---|---|
| Polymer (a-1) (mass %)) | 0 | 100 | 0 | 0 |
| Polymer (b-1)(mass %) Decene-1 content: 2.1 mass % | 100 | 0 | | |
| Polymer (b-2)(mass %) Decene-1 content: 0.6 mass % | | | 100 | 100 |
| Polymer (b-3)(mass %) (hexadecene-1/octadecene-1) content: 4.0 mass % | | | | |
| Nucleating agent (c-1) (ppm) | 0 | 0 | 0 | 1.000 |
| Nucleating agent (c-2) (ppm) | | | | |
| Nucleating agent (c-3) (ppm) | | | | |
| Nucleating agent (c-4) (ppm) | | | | |
| α-olefin content (mass %) | 2.1 | — | 0.6 | 0.6 |
| Porosity (%) | 2.5 | 4.6 | 2.7 | 0.6 |
| Toughness | A | C | A | A |
| Crystallization half time (sec) | 153 | 57 | 124 | 50 |

As seen from Tables 1 and 2, the resin compositions prepared in Examples 1-18, which contain at least copolymer (B) and homopolymer (A) or contain homopolymer (B) and nucleating agent (C), were prone to crystallization as well as offered excellent toughness upon stretching. Thus the microporous films prepared from the resin compositions of Examples 1-18 had high porosities of not less than 3.0%. Moreover, from the results of Examples 13 and 16-18 it can be seen that excellent porosity was obtained even when different nucleating agents were used.

On the other hand, it can be learned the resin compositions of Comparative Examples 1 and 3 offered excellent toughness upon stretching, but were hard to crystallize due to the lack of homopolymer (A). It can be also learned that the resin composition of Comparative Example 2 offered high crystallinity as it contains only homopolymer (A), but offered poor toughness, making film stretching difficult. Moreover, it can be learned that the resin composition of Comparative Example 4 failed to create a sufficient number of micropores due to the excess level of nucleating agent (C).

The present application claims the priorities of Japanese Patent Application No. 2008-199522, filed on Aug. 1, 2008 and Japanese Patent Application No. 2009-003006, filed Jan. 9, 2009, the entire contents of which are herein incorporated by reference.

INDUSTRIAL APPLICABILITY

Microporous films made of poly(4-methyl-1-pentene) resin compositions according to the present invention have high porosities and high melting points. Thus, the microporous films according to the present invention are suitable as separators for batteries such as lithium-ion batteries and therefore are of high industrial value. The microporous films have applicability to condenser separators such as capacitors, air filters, microfiltration membranes, breathable clothes, gas separation membranes, artificial lungs, food packaging materials, easy-to-open packaging materials, oxygen absorber protection films, breathable films, light reflection sheets, light diffusion sheets, synthetic paper, etc.

| Reference Signs List | |
|---|---|
| 10: | lithium-ion battery |
| 12: | cathode sheet |
| 14: | anode sheet |
| 16: | battery separator |
| 18: | roll |
| 20: | battery case |
| 24: | cathode lid |
| 12A, 14A: | lead |

The invention claimed is:

1. A poly(4-methyl-1-pentene) resin composition comprising:
   0-90 parts by mass of 4-methyl-1-pentene homopolymer (A); and
   10-100 parts by mass of 4-methyl-1-pentene copolymer (B) which has a unit derived from 4-methyl-1-pentene and a unit derived from a $C_{2-20}$ α-olefin other than 4-methyl-1-pentene, the total amount of homopolymer (A) and copolymer (B) being 100 parts by mass,
   wherein the amount of the unit derived from a $C_{2-20}$ α-olefin other than 4-methyl-1-pentene is 0.1-2.1 mass % based on the total amount of 4-methyl-1-pentene homopolymer (A) and 4-methyl-1-pentene copolymer (B), and
   the resin composition further comprises 0.1-800 ppm of nucleating agent (C) based on the total weight of 4-methyl-1-pentene homopolymer (A) and 4-methyl-1-pentene copolymer (B).

2. The poly(4-methyl-1-pentene) resin composition according to claim 1, wherein the resin composition comprises 5-90 parts by mass of 4-methyl-1-pentene homopolymer (A) and 10-95 parts by mass of 4-methyl-1-pentene copolymer (B), and the amount of the unit derived from a $C_{2-20}$ α-olefin other than 4-methyl-1-pentene is 0.1-2.0 mass % based on the total amount of 4-methyl-1-pentene homopolymer (A) and 4-methyl-1-pentene copolymer (B).

3. The poly(4-methyl-1-pentene) resin composition according to claim 2, wherein the resin composition comprises 15-50 parts by mass of 4-methyl-1-pentene copolymer (B).

4. The poly(4-methyl-1-pentene) resin composition according to claim 1, wherein the resin composition comprises 100 parts by mass of 4-methyl-1-pentene copolymer (B).

5. The poly(4-methyl-1-pentene) resin composition according to claim 1, wherein the amount of nucleating agent (C) is 0.1-100 ppm based on the total weight of 4-methyl-1-pentene homopolymer (A) and 4-methyl-1-pentene copolymer (B).

6. The poly(4-methyl-1-pentene) resin composition according to claim 1, wherein nucleating agent (C) is at least one compound selected from the group consisting of sodium 2,2-methylenebis(4,6-di-tert-butylphenyl) phosphate, aluminum tris(p-tert-butylbenzoate), stearate, bis(p-methylbenzylidene) sorbitol, bis(4-ethylbenzylidene) sorbitol, talc, calcium carbonate and hydrotalcite.

7. A film made of the poly(4-methyl-1-pentene) resin composition according to claim 1.

8. The film according to claim 7, wherein the film has micropores formed therein.

9. A battery separator comprising the film according to claim 8.

10. The battery separator according to claim 9, wherein the battery separator is used for a lithium-ion battery.

11. A lithium-ion battery comprising the battery separator according to claim 10.

* * * * *